(12) United States Patent
Citterio et al.

(10) Patent No.: US 12,135,194 B2
(45) Date of Patent: *Nov. 5, 2024

(54) BALLISTIC LAMINATE COMPRISING UNIDIRECTIONAL LAYERS JOINED TOGETHER

(71) Applicant: SOCIETA' PER AZIONI FRATELLI CITTERIO, Monza (IT)

(72) Inventors: Giorgio Celeste Citterio, Monza (IT); Filippo Citterio, Monza (IT)

(73) Assignee: SOCIETA' PER AZIONI FRATELLI CITTERIO, Monza (IT)

(*) Notice: Subject to any disclaimer, the term of this patent is extended or adjusted under 35 U.S.C. 154(b) by 304 days.

This patent is subject to a terminal disclaimer.

(21) Appl. No.: 17/614,052

(22) PCT Filed: May 27, 2020

(86) PCT No.: PCT/EP2020/064688
§ 371 (c)(1),
(2) Date: Nov. 24, 2021

(87) PCT Pub. No.: WO2020/239829
PCT Pub. Date: Dec. 3, 2020

(65) Prior Publication Data
US 2022/0228840 A1    Jul. 21, 2022

(30) Foreign Application Priority Data

May 28, 2019 (IT) .................. 102019000007413

(51) Int. Cl.
*F41H 5/04* (2006.01)
*B32B 3/26* (2006.01)
(Continued)

(52) U.S. Cl.
CPC .......... *F41H 5/0478* (2013.01); *B32B 3/266* (2013.01); *B32B 5/022* (2013.01); *B32B 5/024* (2013.01);
(Continued)

(58) Field of Classification Search
CPC ......... B32B 5/022; B32B 5/262; B32B 5/073; B32B 5/265; B32B 5/024; B32B 5/028;
(Continued)

(56) References Cited

U.S. PATENT DOCUMENTS 4,230,057 A    10/1980    Kurz
2004/0092183 A1    5/2004    Geva et al.
(Continued)

FOREIGN PATENT DOCUMENTS

| CN | 207263031 | 4/2018 |
|---|---|---|
| WO | WO-2011/075809 A1 | 6/2011 |
| WO | WO-2018/114266 A1 | 6/2018 |

OTHER PUBLICATIONS

International Search Report and Written Opinion on PCT Appln PCT/EP2020/064688 dated May 27, 2020.
(Continued)

*Primary Examiner* — Camie S Thompson
(74) *Attorney, Agent, or Firm* — Foley & Lardner LLP

(57) ABSTRACT

The present invention relates to a structure for producing ballistic protection which combines high levels of performance in terms of stopping bullets and reducing trauma with great flexibility and breathability. A ballistic laminate comprising joined together unidirectional layers is produced. The ballistic laminate provided by the present invention is preferably produced by superposing at least two layers of ballistic yarns 101 and 103, arranged unidirectionally according to directions inclined relative to one another by approximately 90° (+/−10°). Each layer comprises a plural-
(Continued)

ity of fibres arranged unidirectionally according to a substantially mutually parallel direction (+/−10°).

18 Claims, 3 Drawing Sheets

(51) Int. Cl.
| | | |
|---|---|---|
| *B32B 5/02* | (2006.01) | |
| *B32B 5/06* | (2006.01) | |
| *B32B 5/12* | (2006.01) | |
| *B32B 5/26* | (2006.01) | |
| *B32B 27/08* | (2006.01) | |
| *B32B 27/12* | (2006.01) | |
| *B32B 27/32* | (2006.01) | |
| *B32B 27/34* | (2006.01) | |
| *B32B 27/36* | (2006.01) | |
| *B32B 27/40* | (2006.01) | |

(52) U.S. Cl.
CPC .............. *B32B 5/028* (2013.01); *B32B 5/073* (2021.05); *B32B 5/12* (2013.01); *B32B 5/26* (2013.01); *B32B 5/262* (2021.05); *B32B 5/265* (2021.05); *B32B 27/08* (2013.01); *B32B 27/12* (2013.01); *B32B 27/32* (2013.01); *B32B 27/34* (2013.01); *B32B 27/36* (2013.01); *B32B 27/40* (2013.01); *B32B 2260/023* (2013.01); *B32B 2260/046* (2013.01); *B32B 2262/02* (2013.01); *B32B 2262/0253* (2013.01); *B32B 2262/0261* (2013.01); *B32B 2262/0269* (2013.01); *B32B 2262/101* (2013.01); *B32B 2262/106* (2013.01); *B32B 2307/72* (2013.01); *B32B 2571/02* (2013.01)

(58) Field of Classification Search
CPC .. B32B 5/08; B32B 5/12; B32B 5/142; B32B 5/26; B32B 7/09; B32B 7/04; B32B 7/12; B32B 27/08; B32B 27/12; B32B 27/32; B32B 27/34; B32B 27/36; B32B 27/365; B32B 27/40; B32B 2250/04; B32B 2250/05; B32B 2260/023; B32B 2260/046; B32B 2260/048; B32B 2262/02; B32B 2262/0253; B32B 2262/0261; B32B 2262/101; B32B 2262/106106; B32B 2262/14; B32B 2270/00; B32B 2307/554; B32B 2307/558; B32B 2307/56; B32B 2307/18; B32B 2307/72; B32B 2307/24; B32B 2571/02; F41H 5/0478; F41H 5/0485
USPC ..... 428/113, 295.1, 221; 89/36.02, 915, 922
See application file for complete search history.

(56) References Cited

U.S. PATENT DOCUMENTS

| | | |
|---|---|---|
| 2012/0312151 A1 | 12/2012 | Patel |
| 2016/0302507 A1 | 10/2016 | Lewis et al. |
| 2022/0212436 A1* | 7/2022 | Citterio .................. B32B 37/10 |

OTHER PUBLICATIONS

Chinese Office Action on CN Appln. 202080050804.6 dated Jul. 20, 2023.

* cited by examiner

BALLISTIC LAMINATE COMPRISING UNIDIRECTIONAL LAYERS JOINED TOGETHER

CROSS-REFERENCE TO RELATED APPLICATIONS

This application is a U.S. National Stage Application under 35 U.S.C. § 371 of International Patent Application No. PCT/EP2020/064688, filed on May 27, 2020, which claims priority to Italian Patent Application No. 102019000007413, filed on May 28, 2019, the disclosure of each of which is incorporated herein by reference in their entireties

FIELD OF THE INVENTION

The present invention relates to a structure for producing ballistic protection which combines high levels of performance in terms of stopping projectiles and reducing trauma with great flexibility and breathability.

BACKGROUND OF THE INVENTION

One primary requirement in the production of ballistic protection is to combine high performance in terms of both stopping a projectile and limiting the trauma caused by the energy thereof with appropriate flexibility, not merely to permit good comfort but also to permit the necessary freedom of movement for active service.

While woven fabrics of a warp and weft type structure are very flexible, they have very modest ballistic values because the weft threads are interwoven with warp threads; such interwoven structures limit the speed of propagation of the mechanical wave generated by the impact energy of the projectile on the surface of the fabric, so limiting the quantity of energy absorbed.

Some alternatives to this structure are known such as for example those associated with U.S. Pat. No. 7,820,565 in the name of Barrday® or U.S. Pat. No. 7,132,382 in the name of Teijin® in which the ballistic yarns located in the warp and/or weft are interwoven with non-ballistic threads of a very much lower linear density. The shock wave can thus propagate more easily, so enabling better ballistic performance in comparison with conventional warp and weft woven fabrics.

In one alternative prior art solution, the ballistic yarns are also laid down unidirectionally in a number of adhesive-coated layers and then laminated.

Since said yarns are laid down unidirectionally, the structure is not interwoven so the shock wave propagates unobstructed and very good ballistic results are obtained. The external faces of the structure do, however, have to have films applied which protect the yarn fibrils from any deterioration arising from the friction which inevitably occurs when the ballistic package is flexed. Such further elements not only stiffen the structure but make it completely non-breathable which causes user discomfort. Furthermore, since the reinforcing yarns are laid linearly, when the structure is flexed, they only permit the elongation under tension provided by the mechanical characteristics of the yarn itself.

Examples of such structures associated with unidirectional structures are known for example under the name Gold Flex®, SpectraFlex® Dyneema® SB.

OBJECT OF THE INVENTION

The primary object of the present invention is to provide a ballistic protection element which reduces the disadvantages of the prior art.

BRIEF DESCRIPTION OF THE INVENTION

Said object has been achieved in accordance with the present invention, by the production of a ballistic laminate for producing a ballistic protection structure, the laminate comprising at least one first unidirectional textile element and at least one second unidirectional textile element, the first textile element comprising a first plurality of ballistic fibres arranged substantially according to a first direction, the second textile element comprising a second plurality of ballistic fibres arranged substantially according to a second direction, the first and the second directions forming a relative angle of 90°+1-10°, the laminate being covered by a first external protective layer on the first unidirectional textile element and by a second external protective layer on the second unidirectional textile element, the laminate being characterised in that it comprises a plurality of through-holes having a diameter of between 0.02 mm and 3 mm. The number of through-holes per $cm^2$ is between 0.1 and 10, preferably between 0.5 and 10.

According to a preferred embodiment, the ballistic fibres are composed of an aramid, polyaramid, ultra-high molecular weight polyethylene (UHMWPE), copolyaramid, polybenzoxazole, co-polybenzothiazole, liquid crystal, glass or carbon material, also in blends with one another.

The first and the second protective layers and the at least first and the at least second unidirectional textile elements are preferably joined together by pressing. The through-holes are preferably made after the pressing step. In a preferred embodiment, the first and the second protective layers and the at least first and the at least second unidirectional textile elements are joined together by stitching. At least some of the through-holes are made during the stitching step. When stitching is used, it is preferably carried out by means of needles having a diameter at least 20% greater than the yarn used for stitching. Alternatively, the holes may be made by means of a system equipped with a roller or a cylinder with a plurality of points capable of creating the holes as the roller (or cylinder) rolls under pressure over the laminate.

In a preferred embodiment of the present invention, the first and the second protective layers are in film form and comprise one or more of the following materials: polyurethane, polyester, polyamide, polyethylene or polypropylene film.

The weight of each textile element is preferably between 10 $g/m^2$ and 500 $g/m^2$. A second aspect of the present invention provides a process for producing a ballistic laminate as described above.

A further aspect of the present invention provides a ballistic protection comprising at least one layer of the above-described ballistic laminate.

BRIEF DESCRIPTION OF THE FIGURES

These and further advantages, objects and features of the present invention will become more apparent to a skilled person from the following description and appended drawings which relate to embodiments of an exemplary but not in any way limiting nature, in which.

DETAILED DESCRIPTION

The ballistic laminate provided by the present invention is preferably produced by superposing at least two layers of ballistic yarns 101 and 103, arranged unidirectionally according to directions inclined relative to one another by approx. 90° (+/−10°). Each layer (in the example of FIG. 1, layers 101 and 103) comprises a plurality of fibres 1 arranged unidirectionally according to a substantially mutually parallel direction (+/−10°).

As an alternative to yarns, which are generally composed of numerous filaments, it is possible to use tapes or monofilaments. The linear densities of such yarns (tapes, monofilaments) are advantageously between 20 and 6500 dtex, tenacity values are greater than 10 g per dtex, modulus values are greater than 400 GPa and tensile elongation values are between 1% and 10%; these classes include, for example, aramid yarns produced by Teijin®, DuPont®, Kolon or Hyundai® respectively having the trade names Twaron®, Kevlar®, Heracron® or Alkex®.

In addition to aramid yarns, it is also possible to use ultra-high molecular weight polyethylene yarns produced by Honeywell® or DSM®, having the respective trade names Spectra® and Dyneema®, or also in the form of known tapes having the trade names Tensylon® or Endumax®. Copolyaramid yarns under the name Ruslan®, Rusar®, Autx manufactured by Kamenksvolokno® have recently been introduced. These yarns are characterised by dynamic tensile strength which is at least twice the static strength and so enable elevated ballistic performance. Such dynamic strength values are measured using a procedure developed by Purdue University in the USA, as for example described in the document:

MECHANICAL PROPERTIES OF A265 SINGLE FIBER, Jaeyoung Lima and Weinong W Chena, School of Aeronautics and Astronautics, Purdue University, West Lafayette, IN 47907-2045.

Figure 1:
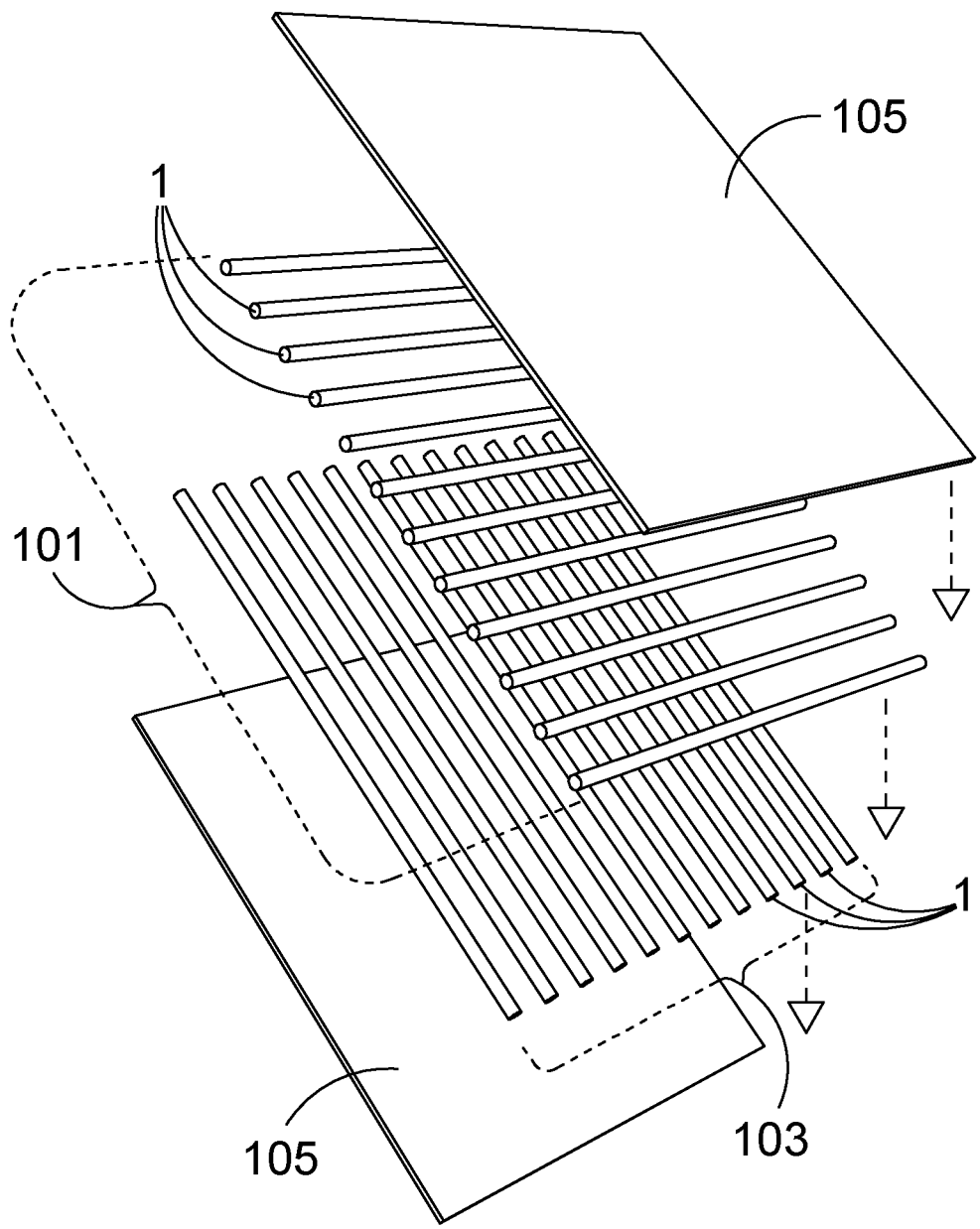
FIG. 1 shows a perspective view of a structure for producing ballistic protection according to one possible embodiment of the present invention before the holes are made.

For the purposes of the present invention, as shown in FIG. 1, the unidirectional structures are produced by superposing two or more layers of ballistic yarns 101 and 103. The at least two layers of ballistic yarns are preferably previously preimpregnated with thermoplastic, elastomeric or thermosetting resins, also in blends with one another. Among these, acrylic, polyethylene, polybutene or polyurethane resins are particularly useful. The quantities applied are between 3% and 30%. The purpose of applying resin is that of facilitating adhesion between the various layers of yarns laid down unidirectionally and superposed on one another. In addition, such resins bring the various yarn fibrils into close contact, so creating a continuity which is useful for ballistic purposes. The external faces of the at least two layers of ballistic yarns 101 and 103 have further elements 105 applied to them with the purpose of enhancing protection of the yarn fibrils from any mechanical action arising from the layers chafing against one another when in service. These further elements may be constituted by films 105, including discontinuous films, felts, meshes and woven/non-woven fabrics. The composition of these external layers must permit permanent adhesion to the base structure. This explains the use of elements based on thermoplastic, elastomeric or thermosetting polymers also in blends with one another. Films of polyethylene, polyurethane, polycarbonate, polyamide, polypropylene, polyester, also in the form of copolymers, are particularly useful. The weights of the additional elements are advantageously between 3 and 30 $g/mm^2$ and more advantageously between 6 and 20 $g/mm^2$. The resulting structure is then subsequently laminated with the deposition of protective films on the external faces. Application of the film offers major advantages because, in the absence of this protection, chafing of the layers against one another during service would result in premature deterioration of the structure in service.

Films which are useful for this purpose are based on essentially thermoplastic polymers, such as for example polyethylene, polypropylene, polyester or polyamide polymers. Since the protection film does not contribute to the ballistic characteristics, it is appropriate for its thickness to be as thin as is possible and compatible with the desired protection. Typical thicknesses are between 6 microns and 20 microns. The resulting structure is subject to the action of pressure and temperature. Pressures are advantageously between 2 and 200 bar and more advantageously between 20 and 40 bar. Pressing temperatures are between 50° and 200° C. and more advantageously between 80° and 140° C. A pressing operation is optionally also carried out before deposition of the protective films. Application of the pressure/temperature combination proceeds in accordance with processes known to those skilled in the art and may proceed both continuously and discontinuously. The resulting laminate is subjected to a further process step which involves producing discontinuities through the entire structure of the laminate.

Figure 2:
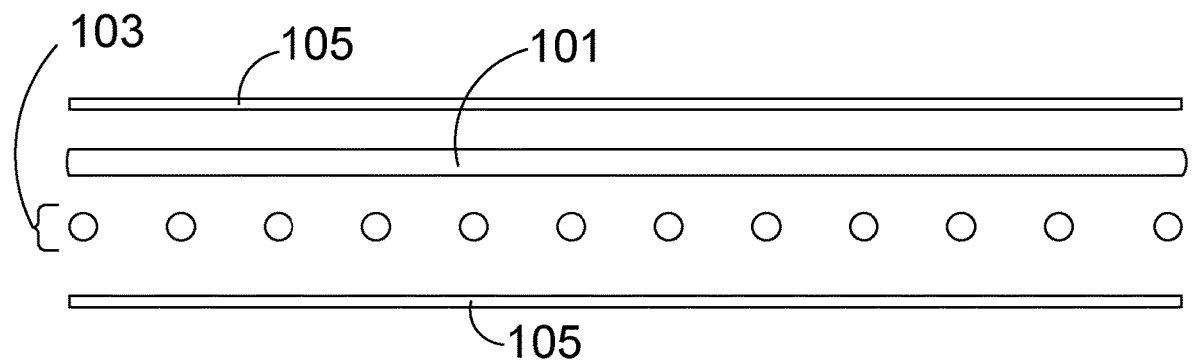
FIG. 2 shows a side view of the structure of FIG. 1.

FIG. 2 is a schematic, sectional view of the structure of FIG. 1: the figure shows, from top to bottom, protective layer 105 (e.g. adhesive film), unidirectional ballistic textile layer 101, unidirectional ballistic textile layer 103 with fibres arranged according to a direction substantially perpendicular to that of the fibres of layer 101 and protective layer 105 (e.g. adhesive film).

Figure 3:
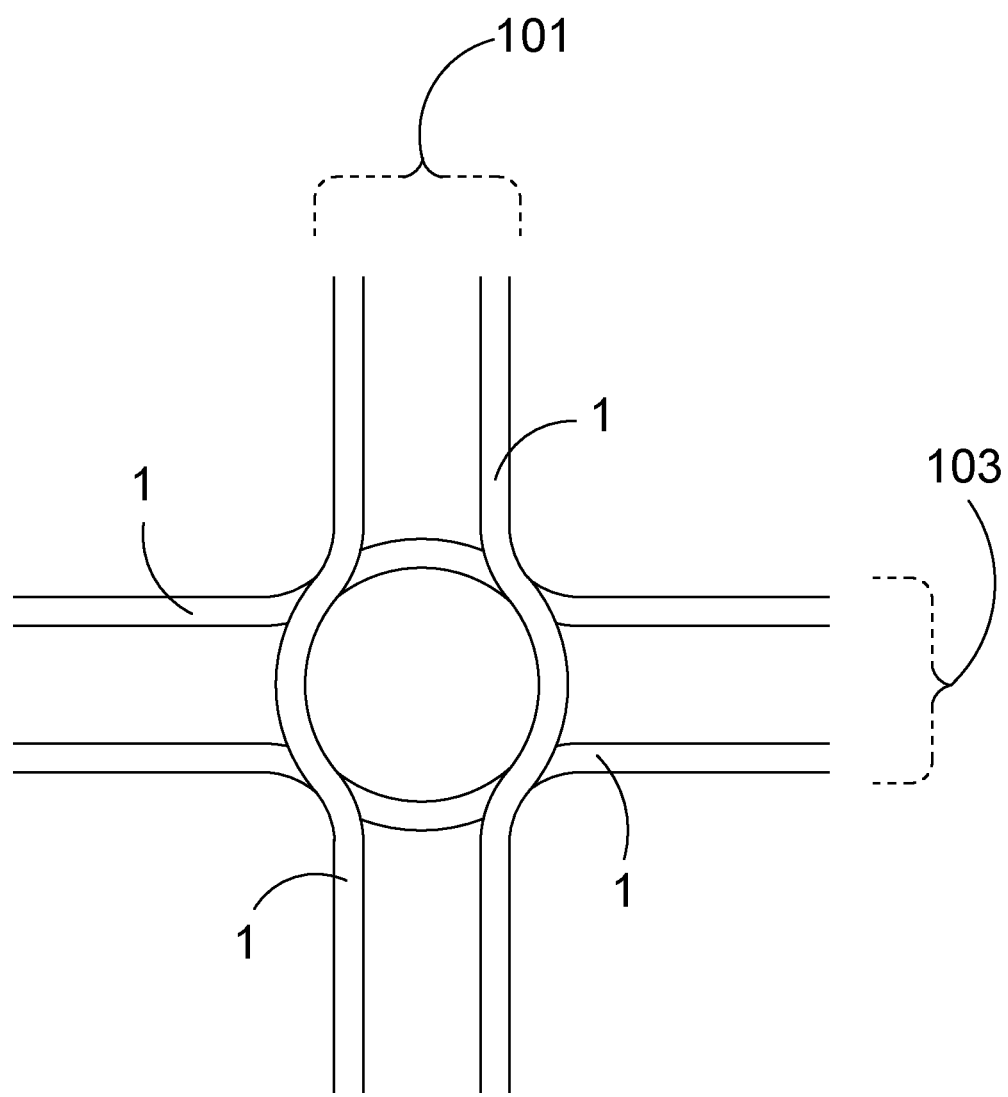
FIG. 3 is a schematic representation of the deflection (or discontinuity) in the rectilinear direction of the unidirectional fibres caused by the through-holes.

Producing through-holes in the unidirectional laminate structure which pass through the entire structure brings about waviness and hence deflections (or discontinuities) in the rectilinear course of the ballistic threads, as shown in FIG. 3. It has surprisingly been found that, thanks to the presence of such deflections, flexibility characteristics are hugely improved and so too are breathability characteristics without compromising ballistic characteristics in terms of both stopping power and the severity of the trauma caused by the impact energy. The number of these through-holes and their diameter may be adapted to the requirements of each individual structure (to increase or reduce flexibility and breathability). Advantageously, the holes are preferably substantially circular in shape (but could also be of another shape, for example elliptical); in a preferred embodiment of the present invention, the diameter of such holes is between 0.02 mm and 3 mm and preferably between 0.5 and 2 mm. The number of such through-holes (i.e. the density thereof) is preferably between 0.1 and 10 per $cm^2$, preferably between 0.5 and 10 per $cm^2$.

In a preferred solution, the various layers of the laminate are stitched together and it is the stitching operation which creates the through-holes.

It is preferable for the diameter of the stitching thread to be less than 20% to 90% of the diameter of the through-hole created by the needle or hook which produces such stitching.

Such stitching thread is selected on the basis of the structure and the weight of laminate which is to be produced. The linear density of the stitching thread is between 20 dtex and 300 dtex. Yarns based on organic polymers such as for example polyester, polyamides, polyethylene, polypropylene, or inorganic yarns such as for example basalt, carbon or glass are used. The type of stitching does not determine the performance of the laminate. In some cases when the diameter of the joining thread is very much smaller than the diameter of the hole/channel created and especially with certain types of joining, the thread is not locked in place and may thus be easily "undone", so ceasing to perform its function. In this case, stitching is performed using a bicomponent monofilament, the external part of which is readily fusible, unlike the internal part which has a very much higher melting temperature and thus remains intact during the pressing step in the presence of heat. In a preferred embodiment, the needles (e.g. crochet) are supplied with non-ballistic threads which pass perpendicularly through all the layers of the laminate, so increasing cohesion between the various layers of the laminate once they have been appropriately knotted for example by a tricot or chain stitch.

The length of the joining stitch is advantageously between 1 and 20 mm and the distance between the various stitching threads in the lengthwise direction is advantageously between 1 and 20 mm.

Stitching may be performed using known, optionally appropriately modified, devices and machinery which are familiar to a person skilled in the art, such as for example quilting machines or multi-head stitching machines.

As stated, stitching of the structure is optional. The essential feature according to the present invention is the presence of the through-holes which, in the absence of the stitching operation, may be obtained by alternative methods. One of the alternative methods for producing the through-holes and the associated discontinuities in the rectilinear direction of the fibres involves subjecting the laminate to the action of a series of punches arranged on a rotating cylinder under appropriate load to exert the pressure necessary to perforate the laminate in such a manner as to cause said punches to penetrate through the entire thickness of the laminate.

It is also possible, in an optional embodiment of the present invention, for the two techniques to coexist, i.e. both stitching and punching (or another technique capable of producing the through-holes) are performed: in this case, some holes will have the stitching thread inside while others will not.

In order to elucidate the content of the present invention, FIG. 3 highlights the waviness which is created in the unidirectionally placed yarn following penetration of the needle, punch or crochet. The production of such discontinuities must not damage the ballistic fibres. The punches, crochet or needles which create such discontinuities must therefore not have sharp or cutting edges but must be appropriately rounded. The structure of the laminate is made up of at least 2 layers of preimpregnated yarns superposed on one another with the direction of the unidirectional yarns of each layer inclined relative to one another by 90°+/−10°.

In a preferred embodiment, the number of layers in an individual laminate is 2 layers, but may also be greater, for example 2, 4, 6, 8 (preferably a multiple of 2). In a preferred embodiment, such layers are then covered with continuous films capable of providing the required abrasion resistance.

A ballistic protection produced with the laminate of the present invention may comprise a variable number of above-described laminated structures, preferably between a minimum of 1 and a maximum of 50.

The invention claimed is:

1. Ballistic laminate for ballistic protection comprising at least one first unidirectional textile element and at least one second unidirectional textile element, the first textile element comprising a first plurality of ballistic fibers arranged substantially according to a first direction, the second textile element comprising a second plurality of ballistic fibers arranged substantially according to a second direction, the first and the second direction forming a relative angle of 90°+/−10°, the laminate being covered by a first protective layer external to the first unidirectional textile element and by a second protective layer external to the second unidirectional textile element, the laminate being characterized in that it comprises a plurality of through holes having a diameter comprised between 0.02 mm and 3 mm, the plurality of through holes passing through the first and second protective layer and the at least first and the at least second unidirectional textile element, wherein the density of the through holes is between 0.1 and 10 per $cm^2$ and at least some of the plurality of through holes are stitching holes wherein a stitching thread passing through a given through hole of the plurality of through holes has a maximum diameter corresponding to 90 percent of the diameter of the given through hole.

2. Ballistic laminate according to claim 1, in which the density of the through holes is between 0.5 and 10 per $cm^2$.

3. Ballistic laminate according to claim 1 in which the ballistic fibers are made of one or more of the following materials: aramidic, polyamide, polyethylene with a very high molecular weight called UHMWPE, copoliaramidic, polybenzoxazole, polybenzothiazole, liquid crystals, carbon, glass.

4. Ballistic laminate according to claim 1 in which the first and second protective layer and the at least first and the at least second unidirectional textile element are joined together by pressing.

5. Ballistic laminate according to claim 4 in which the through holes are made after the pressing step.

6. Ballistic laminate as claimed in claim 5, wherein the through holes are made by means of a rotating device provided with a plurality of points adapted to create the holes during the rolling of the device on the laminate.

7. Ballistic laminate according to claim 1 in which the first and second protective layers and the at least first and the at least second unidirectional textile element are joined together by sewing and at least a part of the through holes is made during the step of sewing.

8. Ballistic laminate as claimed in claim 7, wherein the joining is made by means of needles having a diameter at least 20% greater than the diameter of the yarn used for sewing.

9. Ballistic laminate according to claim 1, in which the first and second protective layers comprise one or more of the following materials: polyurethane, polyester, polyamide, polyethylene, polypropylene, a film, nets, felts or woven/non-woven fabric.

10. Ballistic laminate according to claim 1, in which the weight of each textile element is between 10 $g/m^2$ and 500 $g/m^2$.

11. Process of manufacture of the ballistic laminate of claim 1, comprising the steps of:
arranging at least one first unidirectional textile element and at least one second unidirectional textile element in contact with each other, the first textile element comprising a first plurality of ballistic fibers arranged substantially according to a first direction, the second textile element comprising a second plurality of ballistic fibers arranged substantially according to a second direction, the first and the second directions forming a relative angle of 90°+/−10°;

joining the at least first textile element and the at least second textile element together by pressure;

arranging a first external protective layer on the first unidirectional textile element and a second external protective layer on the second unidirectional textile element;

joining the at least first and the at least second textile element and the first and second protective layer together with a pressure of between 1 and 200 bar;

making a plurality of through holes with a diameter between 0.02 mm and 3 mm, in which the through holes pass through the first and second protective layers and the at least one and the at least second unidirectional textile element, the density of the through holes being between 0.5 and 10 per cm$^2$ and at least some of the holes are stitching holes wherein a stitching thread passing through a hole has a maximum diameter corresponding to 90% of the diameter of the hole.

12. Ballistic protection comprising at least one ballistic laminate layer of claim 1.

13. Ballistic laminate according to claim 1, wherein the stitching thread passing through the hole has a diameter less than 20 percent of the hole.

14. Ballistic laminate according to claim 1, wherein at least some of the holes other than the stitching holes are empty without any stitching thread passing through.

15. The process of claim 11, wherein the first and second protective layer and the at least first and the at least second unidirectional textile element are joined together by pressing.

16. The process of claim 15, wherein the through holes are made after the pressing.

17. The process of claim 11, wherein the first and second protective layers and the at least first and the at least second unidirectional textile element are joined together by sewing and at least a part of the through holes is made during the step of sewing.

18. The process of claim 11, wherein the through holes are made by a rotating device provided with a plurality of points adapted to create the holes during the rolling of the device on the laminate.

* * * * *